United States Patent [19]
Ohkawa

[11] Patent Number: 6,086,211
[45] Date of Patent: Jul. 11, 2000

[54] SIDE LIGHTED SURFACE LIGHT SOURCE DEVICE HAVING ORTHOGONAL PROJECTIONS ON LIGHT CONTROL SURFACE OF EMISSION PLATE AND LIGHT DIFFUSION MEMBER

[75] Inventor: Shingo Ohkawa, Koshigaya, Japan

[73] Assignee: Enplas Corporation, Kawaguchi, Japan

[21] Appl. No.: 09/088,677

[22] Filed: Jun. 2, 1998

[30] Foreign Application Priority Data

Jun. 12, 1997 [JP] Japan .................................... 9-170937

[51] Int. Cl.[7] ...................................................... F21V 7/04
[52] U.S. Cl. .......................... 362/31; 362/330; 362/339; 362/26; 362/27
[58] Field of Search ............................. 362/31, 330, 339, 362/26, 27

[56] References Cited

U.S. PATENT DOCUMENTS 5,408,388  4/1995  Kobayashi et al. ........................ 362/31

Primary Examiner—Sandra O'Shea
Assistant Examiner—Ronald E. DelGizzi
Attorney, Agent, or Firm—Staas & Halsey, LLP

[57] ABSTRACT

A surface light source device of side light type is provided with a guide plate, a primary light source, a reflection sheet, and a prism sheet providing a light control member. An emission surface of the guide plate provides a light control surface (arrow C). The light control surface has a large number of minute projections each of which extends generally orthogonal or slightly obliquely to an incidence surface. Each projection has a pair of slopes. A surface of a light control member (prism sheet) is opposite with the guide plate to provide another light control surface (arrow D). Projections on the light control member extend generally in parallel with the incidence surface of the guide plate and each have first and second slopes which are relatively remote from and relatively near to the incidence surface, respectively. Inclination angle $\beta 2$ of the second slope (as defined with respect to a normal erected on a general surface of the guide plate) is small compared with inclination angle $\beta 1$ of the first slope. Inclination angle $\beta 2$ may be smaller than, for example, 40-degrees. A light diffusion member may be disposed between the emission surface of the guide plate and the light control member.

3 Claims, 10 Drawing Sheets

SIDE LIGHTED SURFACE LIGHT SOURCE DEVICE HAVING ORTHOGONAL PROJECTIONS ON LIGHT CONTROL SURFACE OF EMISSION PLATE AND LIGHT DIFFUSION MEMBER

BACKGROUND

1. Field of the Invention

The present invention relates to a surface light source device of side light type. The present invention is applied to, for example, a back lighting of a liquid crystal display.

2. Related Art

A surface light source device of side light type has been applied to, for example, a liquid crystal display and illuminates the liquid crystal display from its back. This disposition is suitable for a thin configuration of the device.

Usually a rod-shape light source such as a cold cathode tube is employed as a primary light source with respect to the surface light source device of side light type, wherein this rod-shape light source is disposed sidewardly of a guide plate (a plate-like light guiding member). Illumination light that has been emitted from the primary light source is introduced into the guide plate by passing through a side end surface thereof The introduced illumination light propagates through the guide plate and, in this process, light emission occurs from a major surface of the guide plate toward a liquid crystal panel.

As guide plates employable in the surface light source of side light type, there are known two types of guide plates, one of which is a type having generally uniform thickness and the other of which is a type having a tendency that plate thickness decreases as being distant from the primary light source increases. In general, the latter emits illumination light more efficiently than the former.

FIG. 10 is an exploded perspective view illustrating a surface light source device of side light type that uses the latter type of guide plate. In FIG. 11, illustration is made of a section taken along a line (A—A) in FIG. 10. Referring to FIGS. 10 and 11, a light source device 1 is provided with a guide plate 2, a primary light source 3 disposed sidewardly thereof, a reflection sheet 4, a light diffusion sheet H, and a prism sheet 5 providing a light control member. The reflection sheet 4, guide plate 2, light diffusion sheet H and prism sheet 5 are laminatedly arranged.

The guide plate 2 is a transparent guide plate 2 that has a wedge-shaped cross section and is a transparent member formed of acrylic resin. Usually a light diffusion surface is formed on a back surface 2B of the guide plate 2. In some cases, as the guide plate 2 there is employed a scattering light guiding plate that consists of a scattering light guiding member. The scattering light guiding member consists, for example, of a matrix that consists of PMMA (polymethyl methacrylate) and a large number of light-transmitting fine particles uniformly dispersed therein. The refractive index of these fine particles differs from that of the matrix.

The primary light source 3 is provided with a cold cathode tube (fluorescent lamp) 7 and a reflector 8 that is disposed at the back of and that is generally semi-circular in cross section. Illumination light is supplied toward the side end surface of the guide plate 2 by passing through the opening of the reflector 8. The reflection sheet 4 is a sheet-like regular reflection member consisting of a metal foil or the like, or a sheet-like irregular reflection member consisting of a white PET film or the like.

Illumination light L from the primary light source 3 is introduced into the guide plate 2 by passing through an incidence surface 2A that is one side end surface of the guide plate 2. Illumination light L propagates toward a distal end of the guide plate 2 while being repeatedly reflected between the back surface 2B disposed along the reflection sheet 4 and an emission surface 2C. During this propagation, illumination light L is subject to scattering action of the back surface 2B having light diffusion property. If the reflection sheet 4 is an irregular reflection member, illumination light L is subject to also the resulting irregular reflection action.

Illumination light L has gradually decreased its angle of incidence upon the emission surface 2C each time the repetition thereof made by the back surface 2B increases. Such decrease in angle of incidence causes an increase in components whose angles become below the critical angle with respect to the emission surface, thereby promoting the emission of the resulting light rays from the emission surface. As a result, the deficiency in the emission light in a region remote from the primary light source 3 is prevented.

Illumination light that has been emitted from the emission surface 2C has experienced light diffusion made by the back surface 2B having light diffusion property or the irregular reflection made by the reflection sheet 4 and therefore has property of scattering light. However, the main propagation direction of illumination light that has been emitted from the guide plate 2 is inclined toward a distal end (on a side opposite to that where the primary light source 3 exists) with respect to the frontal direction. Namely, the emission light from the guide plate 2 has directivity. Such a property of the guide plate is called "emission directivity".

The prism sheet 5 is disposed in order to correct emission directivity of the guide plate 2. The light diffusion sheet H weakly diffuses illumination light that has been emitted from the guide plate 2 to thereby prevent the light diffusion surface of the back surface 2B from being visually recognized from over the emission surface 2C. The light diffusion sheet H is disposed, as required, further in order to make less prominent brightness, shadows, etc. of portions in the guide plate 2 that are lightened by illumination light. In a case where the guide plate 2 is a scattering guide plate, the light diffusion sheet H is not employed in many cases.

The prism sheet 5 is formed of a light-transmitting sheet material such as polycarbonate. Its prism surface is formed on a surface (outside surface) opposite with the guide plate 2. The prism surface has a large number of projections each of which extends generally in parallel with the incidence surface 2A. Each projection has a pair of slopes that constitute an isosceles-triangular cross section. Angles (angles of inclination) defined between these slopes and the emission surface 2C are equal to each other. Such a prism sheet is called "symmetrical prism sheet".

In a plane perpendicular to the incidence surface 2A the main emission direction of the emission light rays is corrected to the frontal direction of the emission surface 2C. A so-called "double-faced prism sheet" whose both surfaces are each constituted by a prism surface may be used.

Generally, the above-described surface light source device of side light type which uses such a wedge-shaped guide plate and such prism sheet emits a generally uniform output light highly efficiently in the frontal direction.

A structure wherein the emission surface of the guide plate provides a light control surface as indicated by a broken line in FIG. 11 may be employed. This light control surface consists of a large number of projections each of which extends in a direction generally perpendicular to the incidence surface, thereby enhancing outputting efficiency of illumination light.

However, according to the combination with a said conventional prism sheet, output light is hardly directed to the frontal direction of the emission surface 2C correctly. If a small angle of inclination is given to paired slopes forming the projection of the prism surface of the prism sheet, an increase in output light to the frontal direction will be expected but another problem arises.

Namely, difference between the respective output light from the both slopes constituting the slope pair is increased. As a result, fine pulsations in brightness level occur in a direction of repeating of the projections. This pulsation leads to an undesired periodic non-uniformity of brightness. If this device is combined with a unit of a structure having another periodicity, e.g., liquid crystal display panel, such periodic non-uniformity of brightness is likely to cause the occurrence of a moire fringe pattern. Particularly, in a case where the pitch at which picture elements of the liquid crystal panel are arranged and the pitch at which the projections are repeated are approximately equal to each other, tendency that a striking moire fringe pattern will be observed. The moire fringe pattern remarkably degrades the display quality of the relevant display panel.

Also, when having viewed from over the emission surface, the hue of the reflection sheet disposed along the back surface is observed through the slopes where the amount of emission light is less. This is an undesirable level of phenomenon.

OBJECT AND SUMMARY OF INVENTION

An object of the present invention is to provide a surface light source device of side light type which solves the above-described problems and outputs a high quality of illumination light highly efficiently in the frontal direction. According to the present invention, the above-described periodic non-uniformity of brightness is suppressed and moire fringe pattern becomes unlikely to occur. In addition, hue of the reflection sheet disposed along the back surface of the guide plate becomes also unlikely to be observed.

The present invention is applied to a surface light source device of side light type that comprises a guide plate having a major surface providing an emission surface and another major surface providing a back surface, a primary light source that supplies illumination light from an incidence surface provided by a side end surface of the guide plate, and a light control member that is disposed along the emission surface and corrects directivity of illumination light emitted from the emission surface.

According to the present invention, the emission surface of the guide plate provides a first light control surface that is provided with a large number of projections each of which extends in a direction generally orthogonal to the incidence surface while, a surface of the light control member opposite with the guide plate provides a second light control surface that is provided with a large number of projections each of which extends in a direction generally parallel with the incidence surface.

Each projection of the second control surface has a first slope relatively remote from and a second slope relatively near to the incidence surface of the guide plate and these slopes give an asymmetrical sectional configuration. Namely, angle of inclination β2 of the second slope to a normal that is erected on a general surface of the guide plate is set to be small compared with angle of inclination β1 of the first slope to this normal. It is preferable that angle of inclination β1 of the first slope be smaller than angle of 40 degrees. A light diffusion member may be disposed between the emission surface of the guide plate and the light control member. The light diffusion member decreases difference between the first slope and the second slope in terms of the amount of output light by light diffusion, thereby enhancing uniformity and quality of output light.

The present invention is featured by the first light control surface that is given by the emission surface of the guide plate and the second light control surface that is given by a large number of the asymmetrical projections. The first light control surface provides an efficient directional correction generally toward the frontal direction in a plane parallel with the incidence surface of the guide plate. The second light control surface provides an efficient directional correction generally toward the frontal direction in a plane perpendicular to the incidence surface of the guide plate.

The second light control surface on one hand promotes incidence the first slope which is more likely to contribute to the emission of illumination light and on the other hand suppresses incidence to the second slope which is less likely to contribute to the emission of illumination light. The observation made from the outside (light output side) of the front surface of the light control member gives a predominant visual recognition over a large area corresponding to the first slope 13B. Such a predominant visual recognition is not given by another area corresponding to the second slope 13A because this area is narrow although relatively dark. Therefore, no outstanding visual recognition occurs. After all, fine levels of periodic brightness and darkness are suppressed and brightness also is improved as a whole. The concurrent use of the light diffusion member spreads directional distribution of the propagated light rays to thereby reinforce the action of suppressing the occurrence of fine periodic brightness and darkness.

EMBODIMENT

Figure 10:
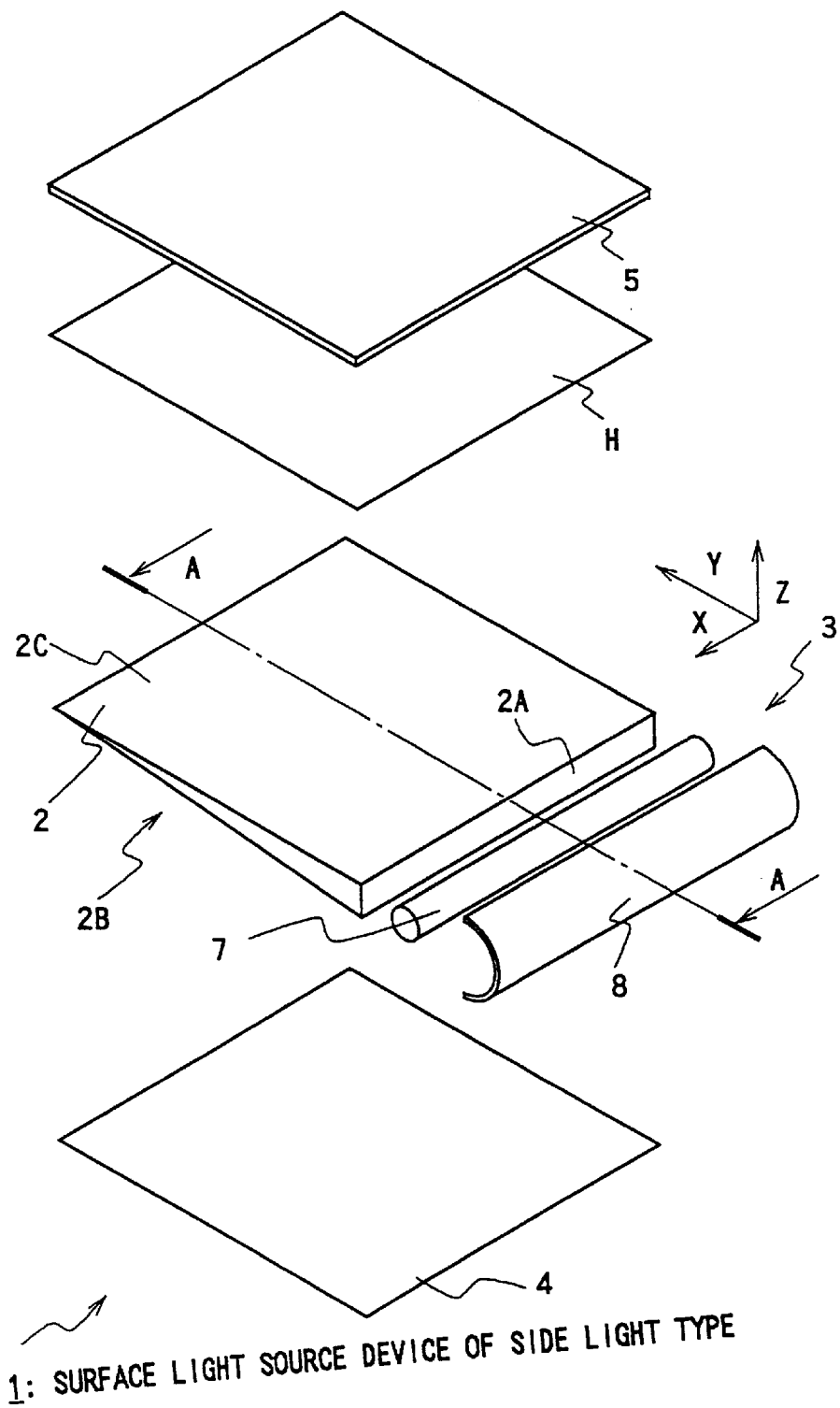
FIG. 10 is an exploded perspective view illustrating a conventional surface light source device of side light type.
Figure 11:
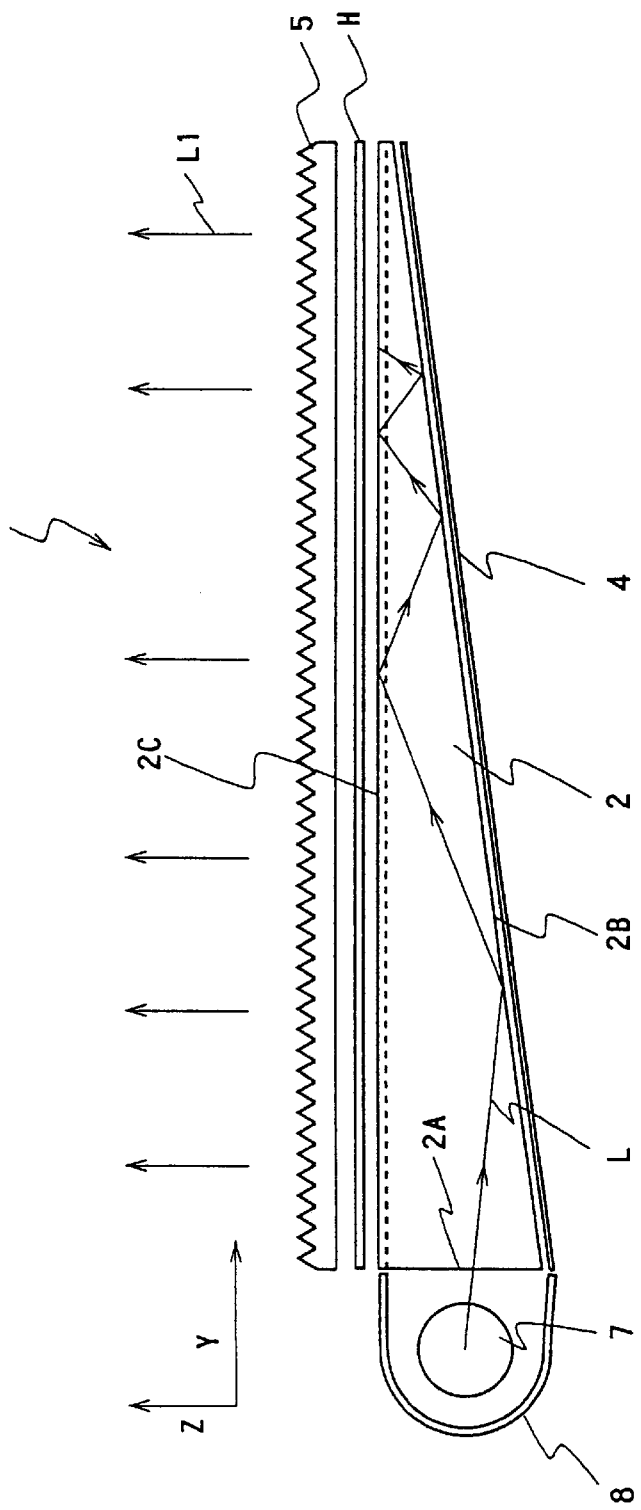
FIG. 11 is a sectional view taken along a line (A—A) in FIG. 10.

An embodiment of the present invention will now be explained with sequential reference to FIGS. 1 through 8. Except items associated with light control surfaces that are provided by a light control member and a guide plate, this embodiment is common to the conventional technique illustrated in FIGS. 10 and 11. Accordingly, the reference symbols are commonly used as the occasion demands and repeated explanations will be simplified.

Figure 1:
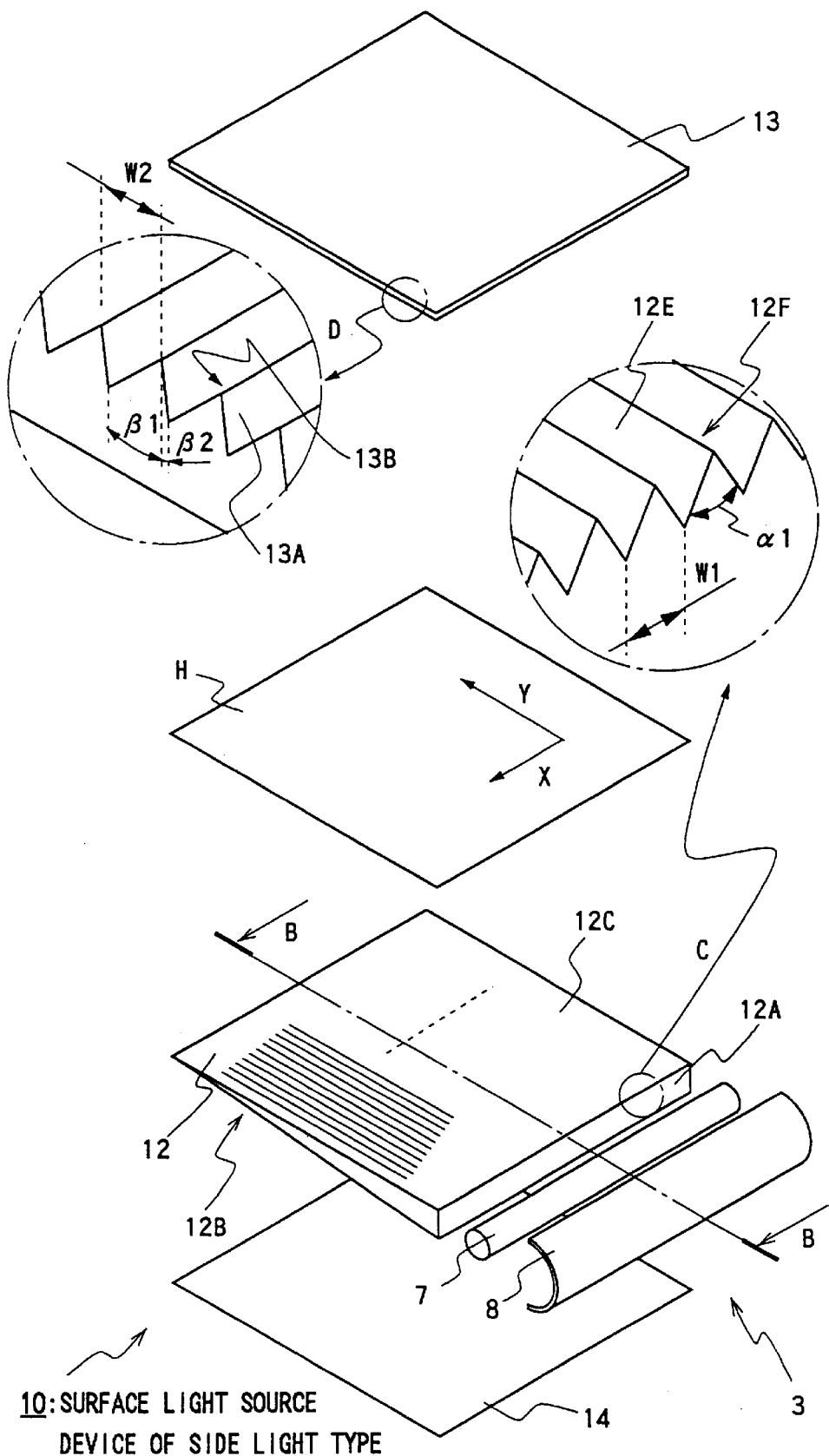
FIG. 1 is an exploded perspective view illustrating a surface light source device of side light type according to an embodiment of the present invention.
Figure 2:
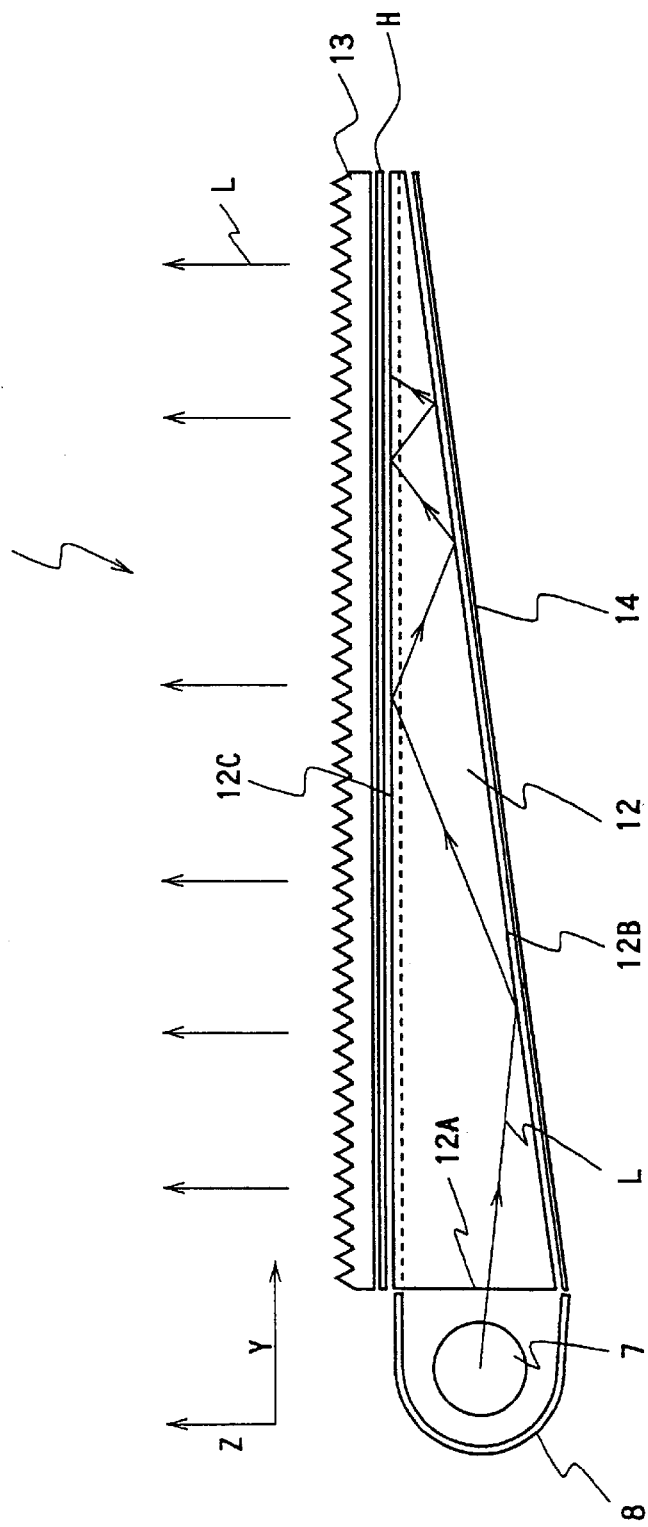
FIG. 2 is a sectional view taken along a line (B—B) of FIG. 1.
Figure 3:
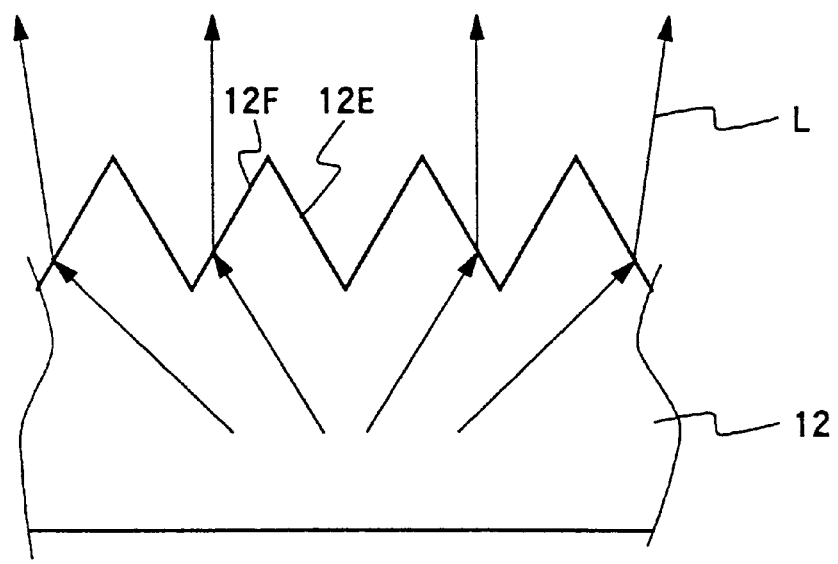
FIG. 3 is a sectional view illustrating function of projections formed on an emission surface of the guide plate which is employed in the device illustrated in FIG. 1.

First, referring to FIGS. 1 and 2, a surface light source device 10 of side light type is provided with a guide plate 12, primary light source 3, reflection sheet 14, light diffusion sheet H, and prism sheet 13 providing a light control member. The reflection sheet 14, guide plate 12, light diffusion sheet H and prism sheet 13 are laminatedly arranged and are retained by a frame (not illustrated) together with the primary light source 3.

As the reflection sheet 14 there is employed a silver-deposited regular reflection member so as to exhibit a high reflectance with respect to illumination light. The reflection sheet 14 efficiently returns illumination light leaking out from a back surface 12B of the guide plate 12 to the interior of the guide plate 12, thereby preventing the loss of illumination light.

The guide plate 12 is a transparent plate having a wedge-shaped cross section and this guide plate consists of, for example, a molded acrylic resin. The guide plate 12 has a pair of major surfaces that respectively provide the back surface 12B and an emission surface 12C. A side end surface 12A of the guide plate 12 provides a minor surface that receives supply of light from the primary light source 3 and this minor surface is called "incidence surface"

A light diffusion power is given to the back surface 12B. This is realized by, for example, a dot pattern (light diffusion pattern) whose dots are light diffusion elements. The light diffusion power may be given so that this power may increase as the distance from the incidence surface 12A increases. Such gradient of light diffusion power is realized by, for example, increasing the occupied density of the light diffusion pattern with an increase in the distance from the incidence surface 12A.

The emission surface 2C of the guide plate 12 provides a first light control surface as illustrated on a partly enlarged scale by being indicated by arrow C. The first light control surface has a large number of very small projections each of which extends in a direction perpendicular to the incidence surface 12A. Each projection has formed thereon a pair of slopes 12E and 12F.

In this embodiment, a pair of the slopes 12E and 12F are directly connected to each other, wherein each projection has a triangular cross section. The function of each projection having the paired slopes 12E and 12F will be understood by referring to FIG. 3. As illustrated by arrow-indicated light rays in FIG. 3, when being emitted from the emission surface 12C of the guide plate 12, illumination light rays are refracted by the slopes 12E and 12F, wherein directivity of the emission light rays is corrected to the frontal direction of the emission surface 12C in a plane parallel with the incidence surface 12A.

The pair of slopes 12E and 12F may each define the same angle with respect to a normal erected on a general surface of the guide plate 12. The apex angle $\alpha 1$ is, for example, approximately 100 degrees. Generally, it is actual that the apex angle $\beta 1$ is in a range of from 50 degrees to 130 degrees, more preferably in a range of from 60 degrees to 110 degrees.

It is preferable that repeating pitch W1 of the fine projection is 50 $\mu$m or less. This value corresponds generally to ¼ or less of the picture element period of a liquid crystal display panel subject to back lighting by the surface light source device of side light type 10. Thus-designed pitch is preferable for the purpose of preventing a moire fringe pattern and suppressing a fine periodic variation in brightness.

Regarding the prism sheet 13, the prism surface formed on the outside surface (the surface on a side opposite with the guide plate 12) functions as a second light control surface. The prism surface is formed, for example, by hardening acrylic ultraviolet-ray setting resin or the like into a prescribed configuration on a base consisting of transparent PET.

The prism surface has a large number of fine projections each of which extends generally in parallel with the incidence surface 12A. Accordingly, the projection of the second control surface extend in the direction generally perpendicular to the projections of the first control surface (the emission surface 12C).

As illustrated on a partly enlarged scale by being indicated by arrow D, each projection in the second control surface has a pair of slopes 13A and 13B. In this embodiment, the pair of slopes 13A and 13B are directly connected to each other, wherein each projection has a triangular cross section. What is important here is that the triangle formed by the cross section of each projection is not an isosceles triangle. In other words, the prism sheet 13 is what is called "asymmetrical prism sheet".

Each projection of the prism sheet 13 has the first slope 13B relatively remote from and the second slope 13A relatively near to the incidence surface 12A. Angles of inclination defined by the first and second slopes 13B and 13A with respect to the normal erected on the general surface of the guide plate are indicated by $\beta 1$ and $\beta 2$, respectively.

According to a feature of the present invention, $\beta 2$ is smaller than $\beta 1$ ($\beta 2 < \beta 1$). It is preferable that angle of inclination $\beta 1$ be smaller than 40 degrees. According to an practical example, $\beta 1 = 35$ degrees and $\beta 2 = 5.6$ degrees.

What is to be noted here is that when the prism sheet 13 from an outside (light-outputting side) front surface thereof, the first slope 13B is observed as occupying an area larger than that occupied by the second slope 13A. As will be explained next, the slope 13B outputs a larger amount of light than that outputted from the slope 13A. Accordingly, a bright and uniform level of output light is obtained as a whole compared with the conventional symmetrical sheet (see the prism sheet 5 in FIGS. 10 and 11).

Figure 4:
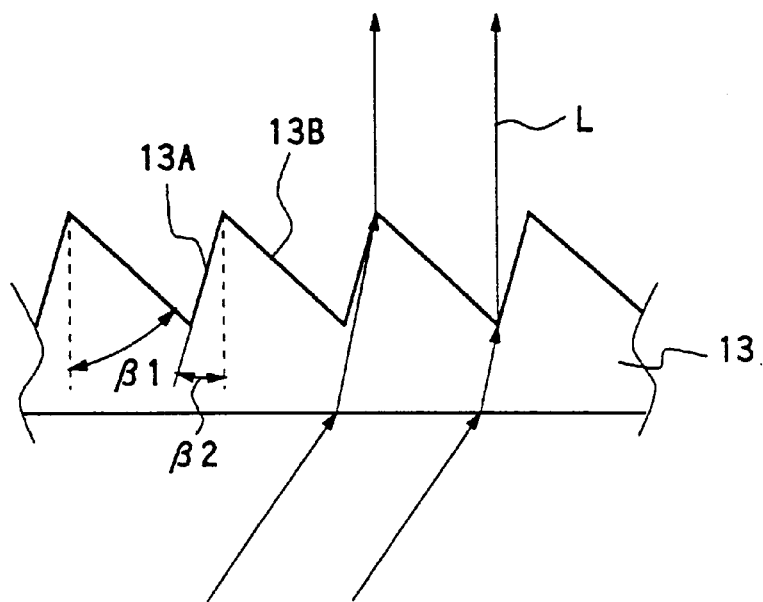
FIG. 4 is a sectional view illustrating function of projections formed on an outside surface of an asymmetrical prism sheet which is employed in the device illustrated in FIG. 1.

The function of the asymmetrical prism sheet 13 will be better understood when referring to FIG. 4. Illumination light L that has entered the prism sheet 13 is emitted from one of the first slope 13B and second slope 13A. What is to be noted here is that, generally, the second slope 13A relatively near to the incidence surface 12A is more unlikely to contribute to emitting illumination light L, particularly emitting the same from the front surface, compared with the first slope 13B relatively remote from the incidence surface 12A. The reason for this is because illumination light L advances in such a way as to define a small angle with respect to the second slope 13A due to the above-described emission directivity of the guide plate.

Taking this nature into consideration, it is possible, with β1 being set larger than β2, to design angle β1 so that generally frontal output is under the condition that efficient inner incidence upon the slope 13B. Amount of light that is incident upon the other slope 13A is small.

However, as described above, when the prism sheet 13 from the outside (light-outputting side) front surface, the slope 13A is observed as occupying an area smaller than that occupied by the slope 13B. And therefore the region (slope 13B) that is higher in brightness level becomes predominant as a whole.

As in the case of W1, it is also preferable that repeating pitch W2 of the fine projection of the prism sheet 13 be 50 μm or less. This value corresponds generally to ¼ or less of the picture element period of the liquid crystal display panel that is subjected to back lighting done by the surface light source of side light type 10. Thus-designed pitch is preferable for the purpose of preventing a moire fringe pattern and suppressing a fine periodic variation in brightness.

Behavior of illumination light is generally as follows. Illumination light L that has been introduced from the incidence surface 12A of the guide plate 12 propagates there through by being repeatedly reflected between the back surface 12B and the emission surface 12C while being diffused by the back surface 12B. During this process, illumination light L that has cleared the conditions for the critical angle of incidence to the emission surface 12C from inside is emitted from the emission surface 12C with a generally uniform level of intensity.

As stated previously, in a plane parallel with the incidence surface 12A the light that has been emitted from the emission surface 12C has its direction corrected to the frontal direction and, on the other hand, in a plane perpendicular to the incidence surface 12A, propagates with its direction being directed preferentially slantwise to thereafter enter the light diffusion sheet H. The light diffusion sheet H weakly diffuses illumination light and thereby slightly spreads the distribution of the propagation direction. Owing to this action, uniformity of the light outputted from the surface light source device 10 is enhanced. Subsequently, the light has its direction efficiently corrected to the frontal direction in a plane perpendicular to the incidence surface 12A by the function of the asymmetrical prism sheet 13.

The following measurements have been conducted to demonstrate features of the present invention. The results are shown in graphs of FIGS. 5 through 9. In each of these graphs, the ordinate axis Xθ represents angles in a plane parallel with the incidence surface and the abscissa axis Yθ represents angles in a plane perpendicular to the incidence surface. The 0 degree of the Xθ represents the frontal direction in a plane parallel with the incidence surface and the 0 degree of the Yθ represents the frontal direction in a plane parallel with the incidence surface. The ± of the Xθ corresponds to the left and right as viewed from the incidence surface. The + of the Yθ corresponds to the inclination made toward a distal end side of the guide plate and the − of the Yθ corresponds to the inclination made toward the incidence surface of the guide plate. The intensities of illumination light rays that are emitted from the guide plate in respective directions have been detected. These conditions are commonly applied to the graphs in FIGS. 5 through 9.

Figure 5:
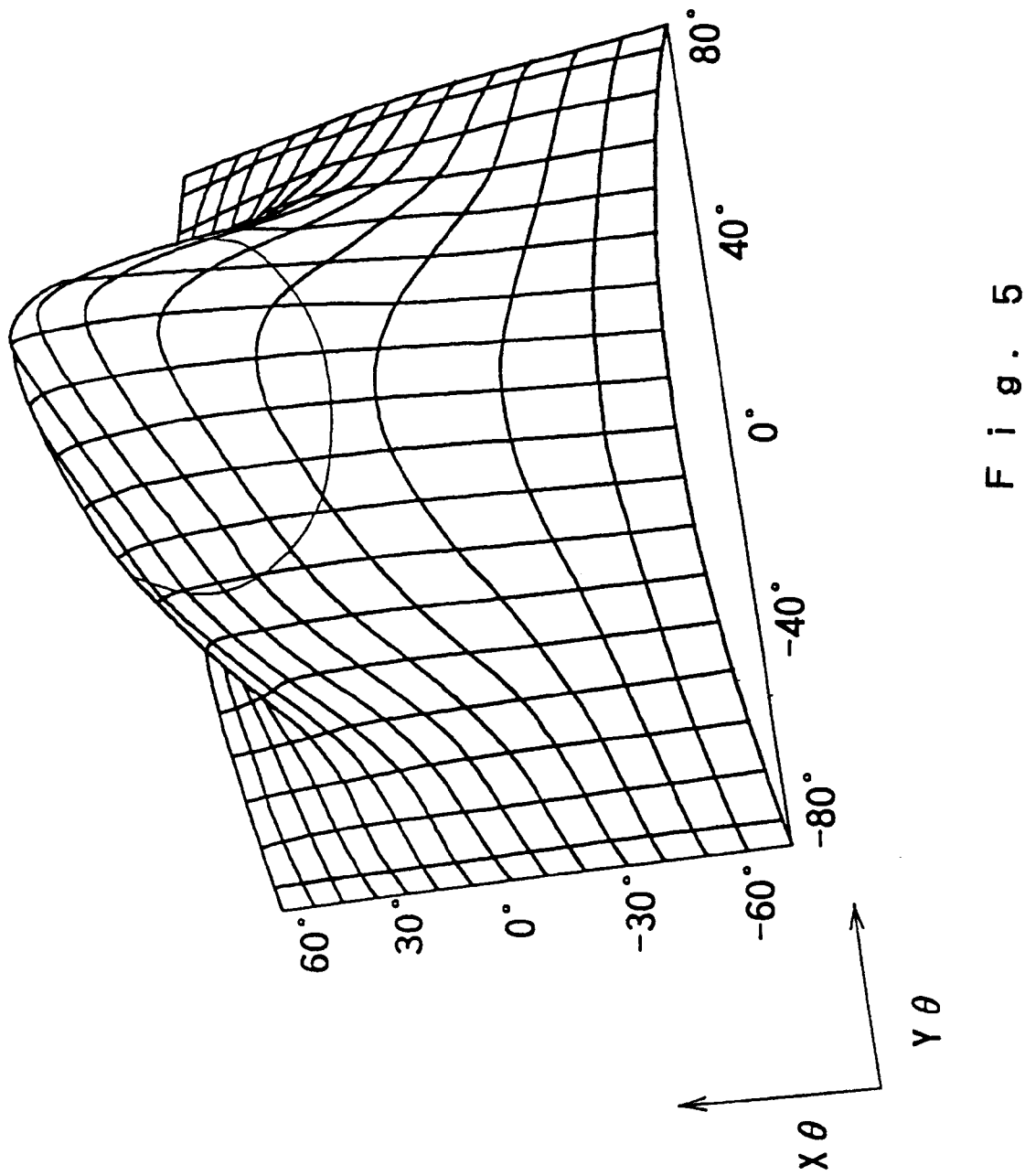
FIG. 5 is a graph illustrating directional distribution of intensity of light rays outputted from light diffusion sheet which illumination light that has been emitted from a flat emission surface is inputted.
Figure 6:
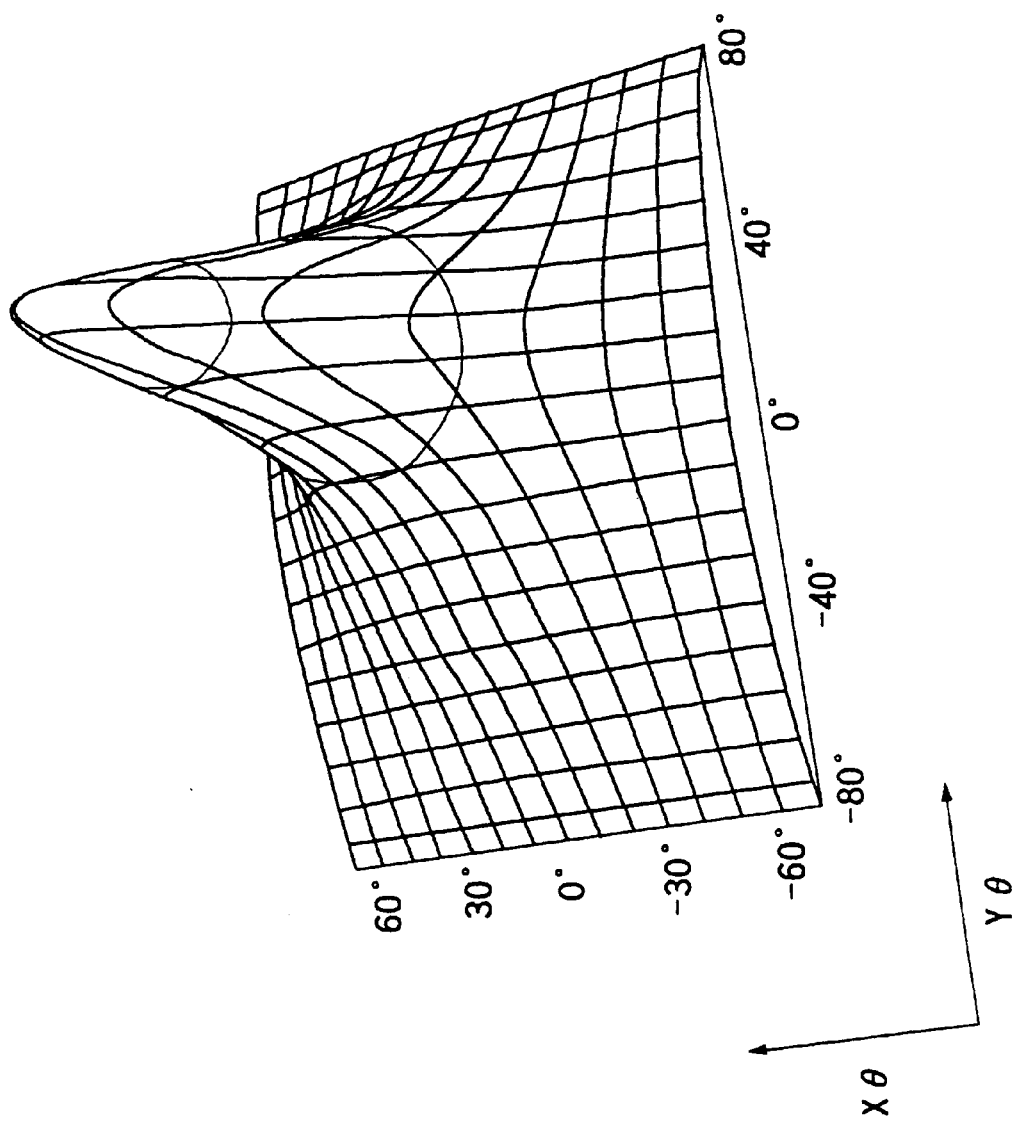
FIG. 6 is a graph illustrating directional distribution of intensity of light rays outputted from the light diffusion sheet to which illumination light that has been emitted from an emission surface providing a light control surface is inputted.
Figure 7:
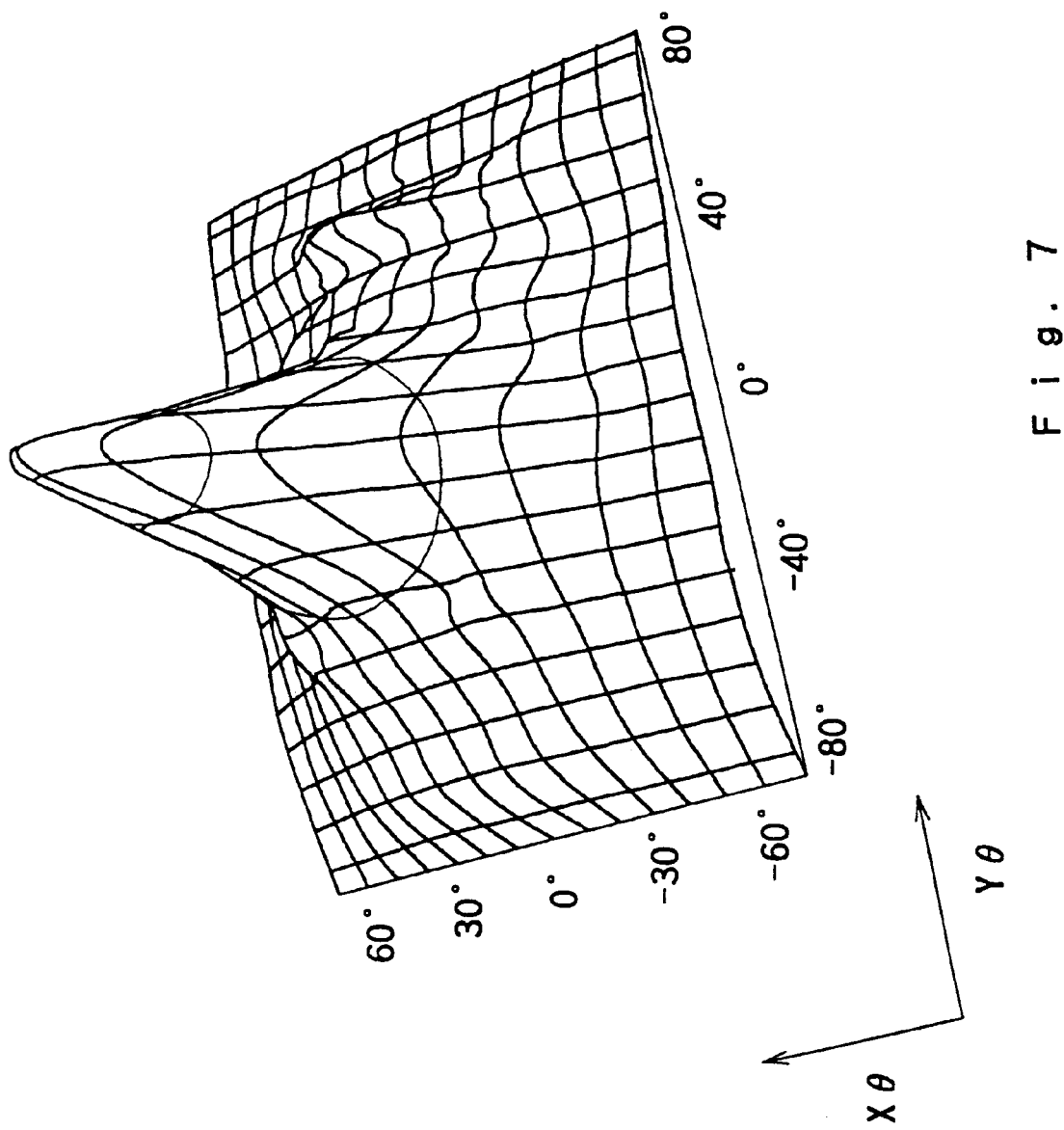
FIG. 7 is a graph of a measurement example 1, illustrating directional distribution of output light (the emission light from an asymmetrical prism sheet) of the device illustrated in FIG. 1.

I. First, in order to see the function of the first control surface, directional distribution of illumination light from the emission surface having no prism surface and directional distribution of illumination from the emission surface 12C of the above-described guide plate 12 were measured through the light diffusion sheet H. The results of the former measurement are shown in FIG. 5 and the results of the latter measurement are shown in FIG. 6. The following will be understood by comparison between FIG. 5 and FIG. 6.

(1) The peak direction of intensity, in each case, is inclined approximately 35 degrees from the frontal direction toward the distal end side of the guide plate when in a plane perpendicular to the incidence surface and, when in a plane parallel with the incidence surface, stands in the frontal direction. This demonstrates that directivity of the light emitted from the guide plate is not lost by the light diffusion sheet H.

(2) Regarding sharpness of the peak, there exists almost no difference between FIG. 5 and FIG. 6 for in a plane perpendicular to the incidence surface but, for in a plane parallel with the incidence surface, there exists a great difference therebetween.

(3) Regarding height of the peak, FIG. 6 is greater than FIG. 5.

These facts (1) to (3) demonstrate that the first control surface functions to perform efficient directional correction toward the frontal direction in a plane parallel with the incidence surface.

II. In order to see the function of this embodiment which has employed the second light control surface on the asymmetrical prism sheet in addition to the first control surface on the emission surface, measurement was performed of directional distribution of intensity of the light outputted from the device illustrated in FIG. 1 (the light emitted from the asymmetrical prism sheet), the results being shown in FIG. 7 (measurement example 1).

Figure 8:
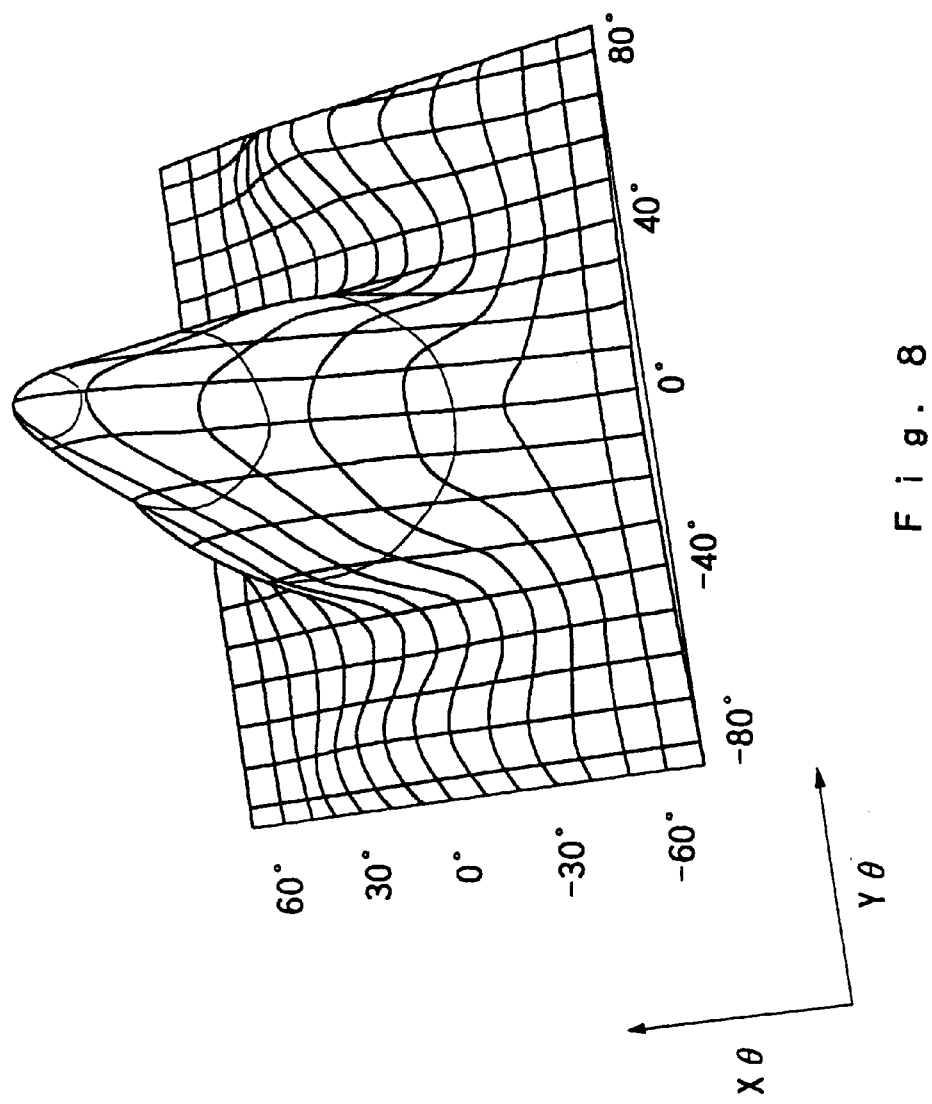
FIG. 8 is a graph of a reference example 1, illustrating directional distribution of intensity of output light (the emission light from a symmetrical prism sheet) from a conventional device that has employed a symmetrical prism sheet having an apex angle of 90 degrees.
Figure 9:
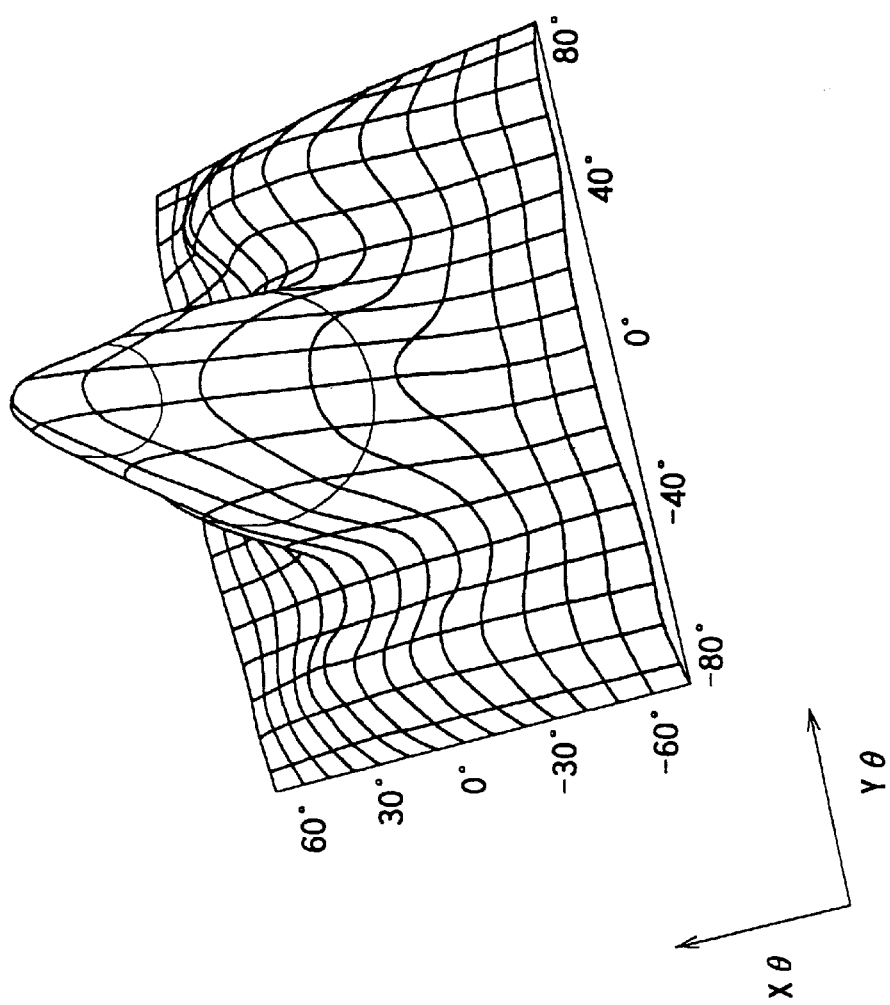
FIG. 9 is a graph of a reference example 2, illustrating directional distribution of intensity of output light (the emission light from the symmetrical prism sheet) from a conventional device that has employed a symmetrical prism sheet having an apex angle of 70 degrees.

Also, for comparison, measurement was performed of directional distribution of intensity of the light that is outputted when a symmetrical prism sheet has been employed in place of the asymmetrical prism sheet (i.e. the light that is emitted from the symmetrical prism sheet). The results obtained in a case where the apex angle of the symmetrical prism sheet is 90 degrees are shown in FIG. 8 (reference example 1) while, on the other hand, the results obtained in a case where the apex angle is 70 degrees are shown in FIG. 9 (reference example 2). The followings will be understood from the comparison made between each of FIG. 7 (measurement example), FIG. 8 (reference example 1) and FIG. 9 (reference example 2).

(1) Each of the measurement example (FIG. 7), reference example 1 (FIG. 8) and reference example 2 (FIG. 9) demonstrates preferential emission generally in the frontal direction both in a plane perpendicular to the incidence surface and in a plane parallel with the incidence surface.

(2) However, viewed more in detail, in the reference example 1 (FIG. 8) the preferential emission direction is inclined approximately 10 degrees toward the distal end of the guide plate. Further, in each of the first (FIG. 8) and reference example 2 (FIG. 9), another relatively large and unnatural peak appears around a direction inclined approximately 80 degrees toward the distal end of the guide plate. In the measurement example, no such a parasitic peak appears.

(3) Regarding sharpness of the peak, there exists a clear difference between the measurement example and each of the reference examples 1 and 2. The peak of the measurement example is shaper than that of each of the reference examples 1 and 2.

(4) Regarding height of the peak, also, there exists a clear difference between the measurement example and each of the reference examples 1 and 2. The peak of the measurement example is higher than that of each of the reference examples 1 and 2.

These facts (1) to (4) demonstrate that, according to the feature (the combination of the first control surface provided by the emission surface of the guide plate and the second control surface provided by the outside surface of the asymmetrical prism sheet) of the present invention, excellent output characteristics are obtained. Namely, such facts demonstrate that the efficient directional correction toward the frontal direction in each of the both planes parallel and perpendicular to the incidence surface is accomplished and no undesirable parasitic peak appears.

The above-explained embodiment is not limitative of the present invention. For example, the following modifications may be employed.

(i) The pair of slopes 13A and 13B forming the second light control surface provided by the outside surface of the light control member (asymmetrical prism sheet 13) can be designed to define various angles of inclination b1 and b2. The values ($\beta1=35$ degrees; and $\beta2=5.6$ degrees) in the embodiment are one preferable example. In order to realize a desired output direction that is around the frontal direction, angles of inclination $\beta1$ and $\beta2$ may be selected by taking factors such as the preferential emission direction from the guide plate, the refraction index of the light control member, etc. into consideration.

(ii) In the above-described embodiment, the projections of the first and the second light control surface are each formed by directly connecting the paired slopes to each other. But this is not limitative of the present invention. For example, the pair of slopes may be connected together by a smoothly curved surface. Also, the slope itself may be formed by a curved surface.

(iii) The light diffusion member employed in the above-described embodiment (the light diffusion sheet H disposed between the guide plate 12 and the asymmetrical prism sheet) may be omitted. Or, the light diffusion member may be disposed on the outside of the asymmetrical prism sheet 13.

(iv) Repeating pitch of the projections of each of the first and the second light control surface may be selected in design. In general, it is preferable for the purpose of preventing a moire fringe pattern that such repeating pitch is smaller than the pitch of the fine periodic structure of the light crystal panel.

(v) As the reflection member (the reflection sheet 14) there may be employed a regular reflection member made of any material or an irregular reflection member made of white PET or the like.

(vi) No particular limitation is imposed on the light-transmitting material that constitutes the light control member (the asymmetrical prism sheet 13). The above-described embodiment (the material prepared by hardening the acrylic ultraviolet-ray setting resin on the transparent PET base) is a typical example. For example, polycarbonate (PC), polymethyl methacrylate (PMMA) or the like may be employed.

Also, it is preferable that the light control member has flexibility. However, a material such as a so-called prism body which has generally no flexibility may be employed.

(vii) Light diffusion power of the back surface of the guide plate used in the embodiment is given thereto by the dot-like rough region pattern having a gradient of occupation density created by the mat surface processing. However, this is not limitative of the present invention. For example, the light diffusion power may be given by a printed pattern of light-diffusing ink, a method wherein the entire back surface is made a mat surface, further blast processing sand paper, or chemical etching treatment.

(viii) Cross-sectional configuration of the guide plate may be not a wedge shape. For example, a uniform thickness of guide plate may be employed.

(ix) The incidence surface of the guide plate may be defined at two or more end surfaces. A plurality of primary light sources may be employed correspondingly.

(x) The primary light source may be constituted by a light source other than a rod-shape light source such as a fluorescent lamp. For example, the primary light source may be formed by disposing a plurality of point light sources such as light-emitting diode.

(xi) The surface light source device of the present invention may be applied to other than back lighting of the liquid crystal display device. For example, such device can be widely applied to various illuminators or displays.

What is claimed is:

1. A surface light source device of side light type comprising:

guide plate having an emission surface, a side end surface and a back surface;

a primary light source supplying illumination light to the side end surface of the guide plate; and a light control member disposed along the emission surface of the guide plate so as to correct directivity of illumination light that has been emitted from the emission surface, the light control member having a surface opposing the guide plate, the emission surface of the guide plate having a large number of projections each of which extends in a direction generally orthogonal to the side end surface;

the surface of the light control member opposing the guide plate having a large number of projections each of which extends in a direction generally parallel with the side end surface of the guide plate; and each projection of the light control member having a first slope relatively remote from the side end surface of the guide plate and a second slope relatively near to the side end surface of the guide plate, the angles of inclination $\beta1$, $\beta2$ of the first and second slopes respectively being defined with respect to a normal erected on a general surface of the guide plate, the angle of inclination $\beta2$ being small compared with angle of inclination $\beta1$.

2. A surface light source device of side light type according to claim 1, wherein angle of inclination $\beta1$ of the first slope is smaller than 40 degrees angle.

3. A surface light source device of side light type according to claim 1, wherein a light diffusion member is disposed between the emission surface and the light control member.

* * * * *

UNITED STATES PATENT AND TRADEMARK OFFICE
CERTIFICATE OF CORRECTION

PATENT NO.:     6,086,211
DATED     :     July 11, 2000
INVENTOR(S):    Shingo OHKAWA It is certified that errors appears in the above-identified patent and that said Letters Patent is hereby corrected as shown below:

Column 6,
    line 8, change "$\beta 1$" to --a1--.

Column 7,
    line 65, change "Y0" to --Yq--.

Column 10,
    line 32, before "guide" insert --a--.

Signed and Sealed this

Seventeenth Day of April, 2001

*Attest:*

NICHOLAS P. GODICI

*Attesting Officer*     *Acting Director of the United States Patent and Trademark Office*